United States Patent [19]

Douglas, Jr.

[11] Patent Number: 4,651,231
[45] Date of Patent: Mar. 17, 1987

[54] TIMING SYSTEM FOR LASER DISC HAVING DIGITAL INFORMATION

[75] Inventor: Daniel G. Douglas, Jr., Louisville, Colo.

[73] Assignee: Reference Technology, Inc., Boulder, Colo.

[21] Appl. No.: 650,873

[22] Filed: Sep. 13, 1984

[51] Int. Cl.⁴ .......................... H04N 5/76; G11B 7/00
[52] U.S. Cl. .................................. 358/342; 358/335; 358/337; 360/36.2
[58] Field of Search ...................... 358/335, 342, 337; 360/72.1, 72.2, 36.1, 36.2; 369/275; 371/38

[56] References Cited

U.S. PATENT DOCUMENTS 4,564,945  1/1986  Glover et al. ......................... 371/38
4,586,173  4/1986  Ando ................................... 369/275

*Primary Examiner*—Robert L. Richardson
*Attorney, Agent, or Firm*—Townsend and Townsend

[57] ABSTRACT

A timing system is disclosed for reading symbol sites, analog or digital from a video signal preferable in a recorded laser format. A video signal having analog data events at precise timed intervals is recorded on a first commercial grade video recorder. The tape is re- played through a second commercial grade recorder to an optical lathe. At the time of playback to the optical lathe, a timing signal is derived from a phase lock loop circuit added to the second commercial grade and recorded on the FM band of the video signal, which signal is then etched by the lathe onto a master optical disc. Simultaneously with the recordation of the substantially continuous FM band, selected horizontal scans on each frame are loaded with both timing and reference level data, the timing portion of these selected scans being later used for phase comparison of the signal. An optical disc master results which has a continuous FM band timing track as well as an interleaved timing information contained in the video signal. Replication from the optical master to stamped copies occurs with the stamped copies being distributed to discrete players for data access. At each player, the continuous FM band timing track is used for the master clock. This continuous clock cycles a ramp generator with each clock pulse. Phase synchronization is taken from the selected horizontal scans distributed through each frame by having a phase comparator change the sample level of the cycled ramp. The changed level of the cycled ramp adjusts the phase of the master clock pulse. Precise readout of analog symbol event occurs in precise timed and phase corrected.

8 Claims, 12 Drawing Figures

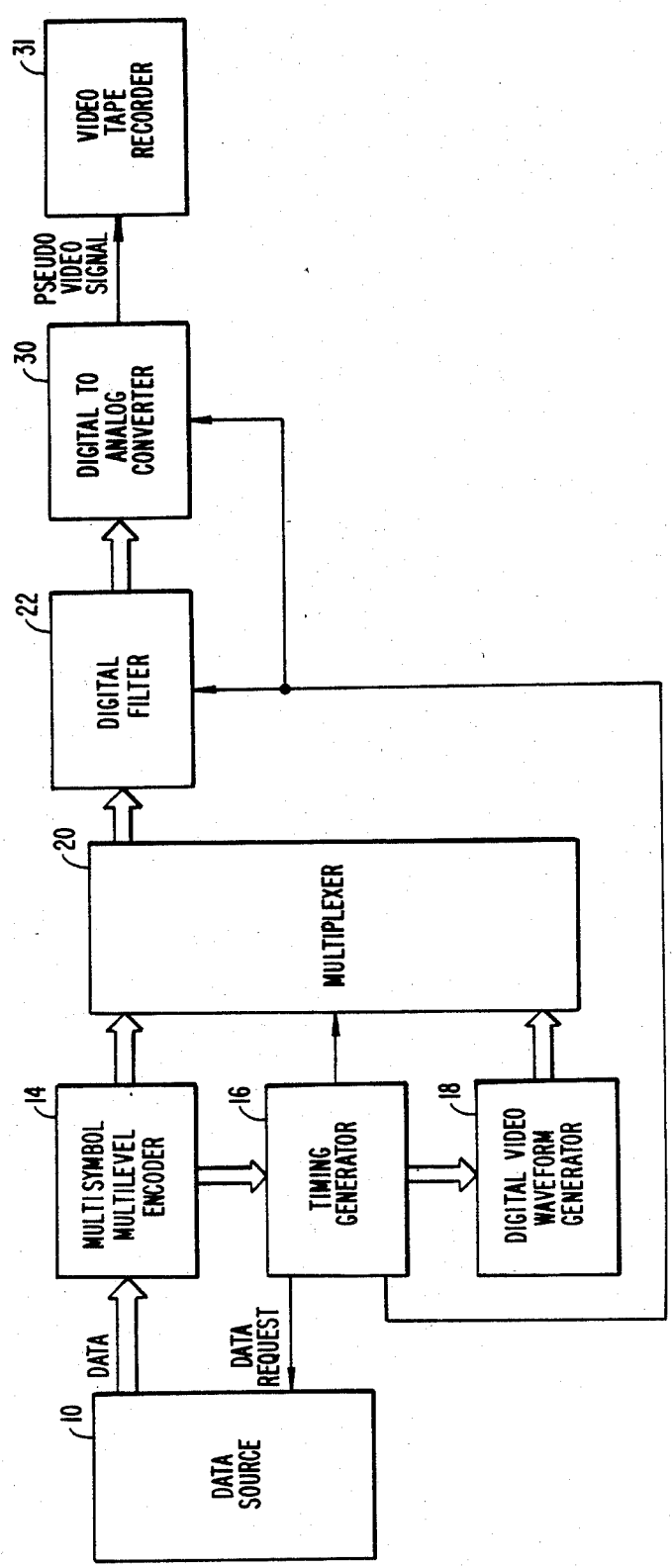
FIG._1a.
DATA ENCODING

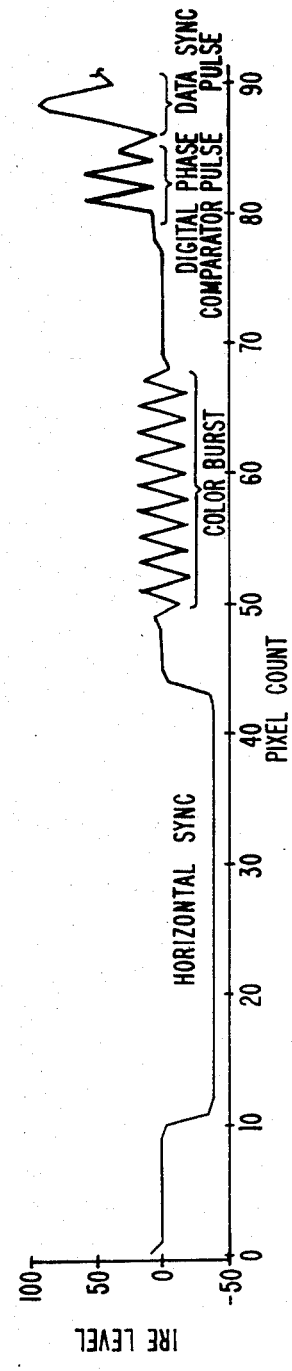
FIG._1b.
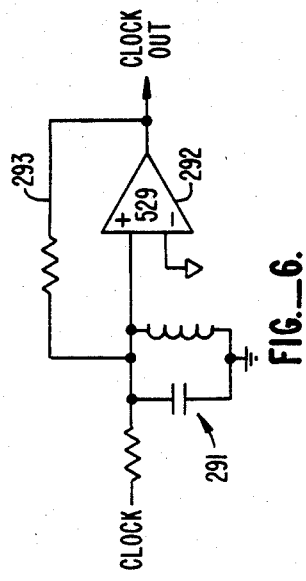
FIG._6.
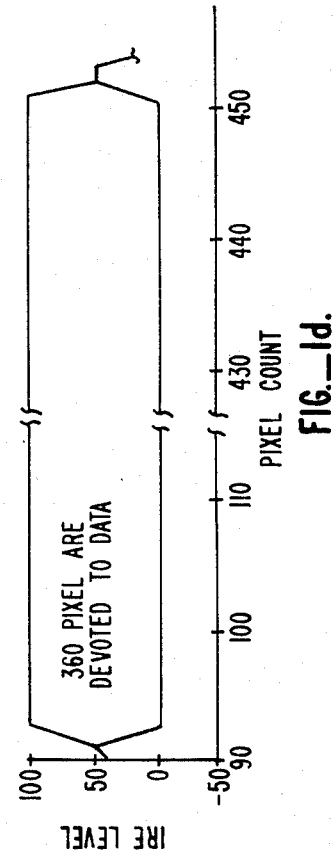
FIG._7.
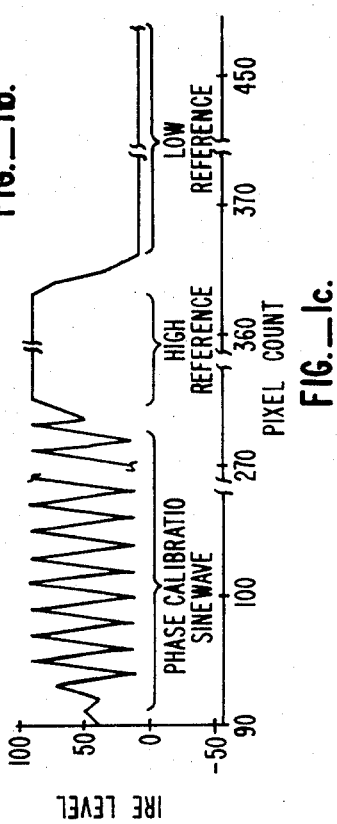
FIG._1c.
FIG._1d.

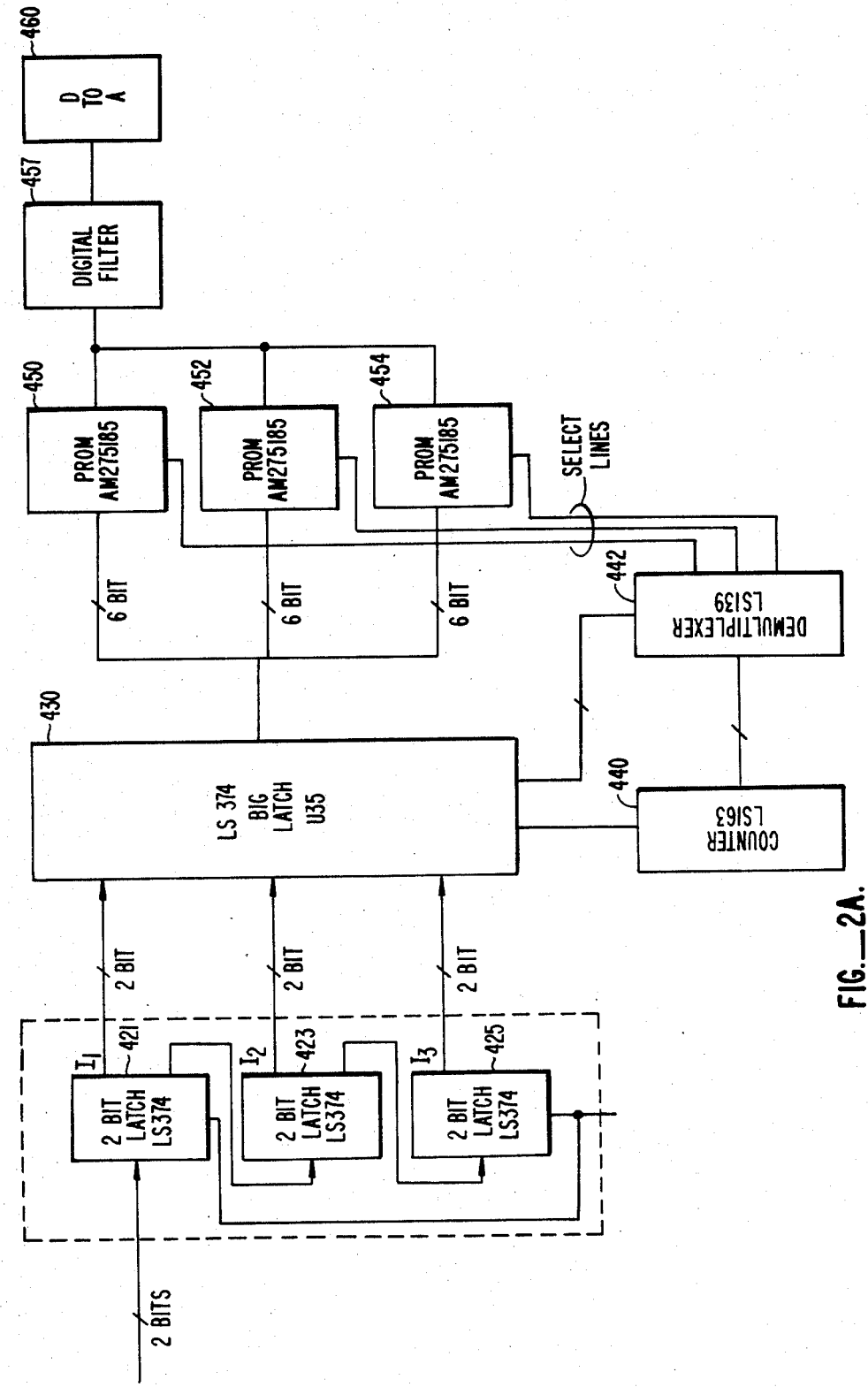
FIG._2A.

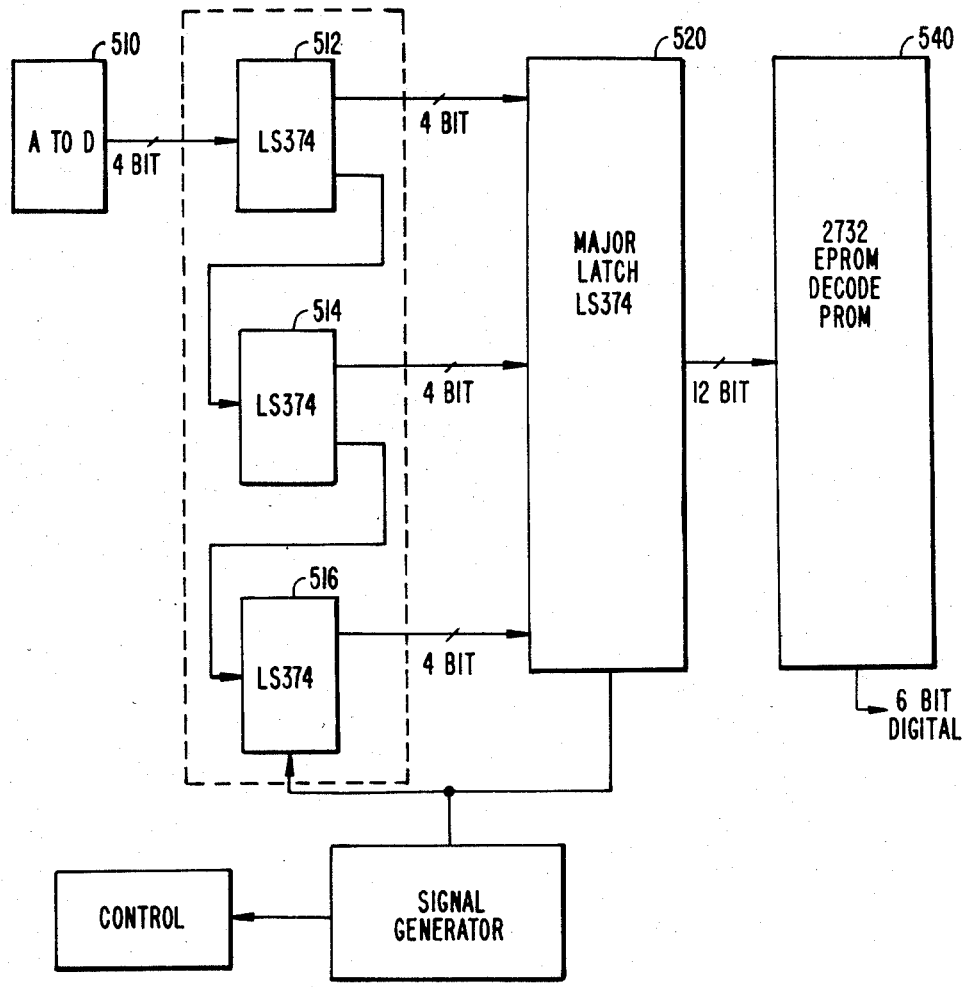
FIG._2B.
FIG._2C.

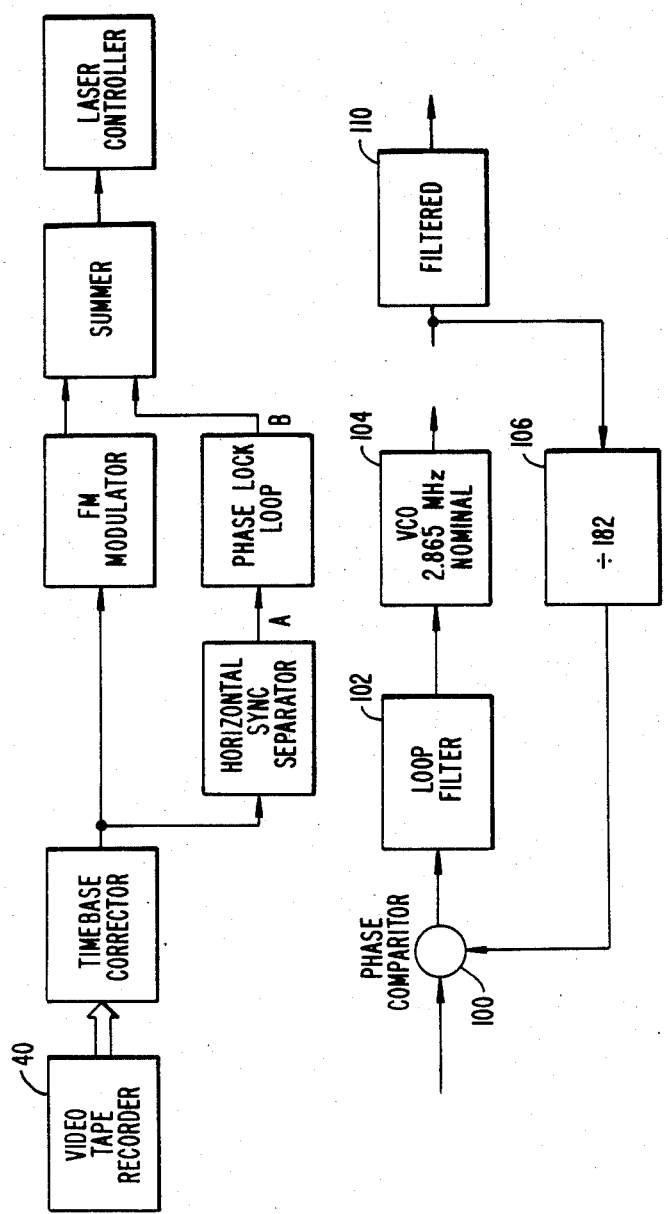
FIG._3.
CLOCK INSERTER

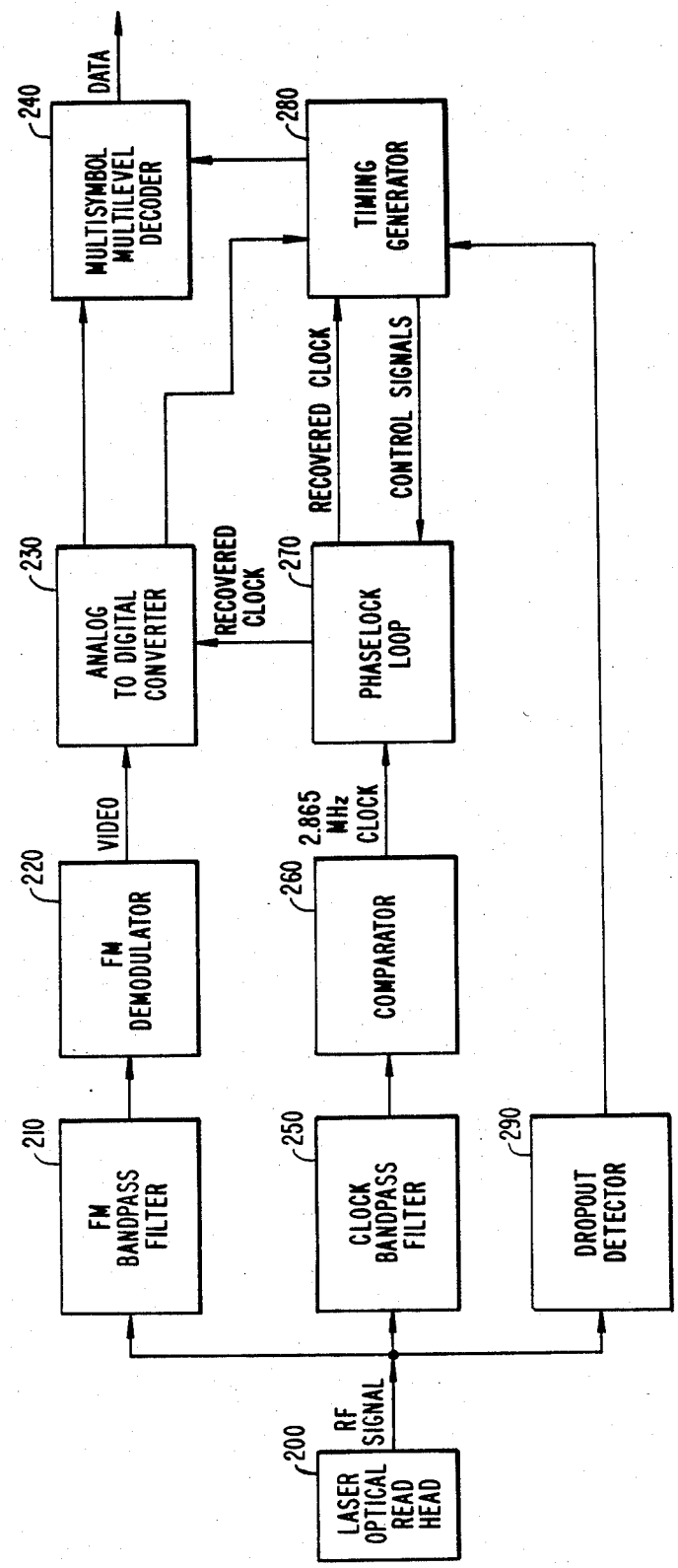
FIG._4.
DATA RECOVERY

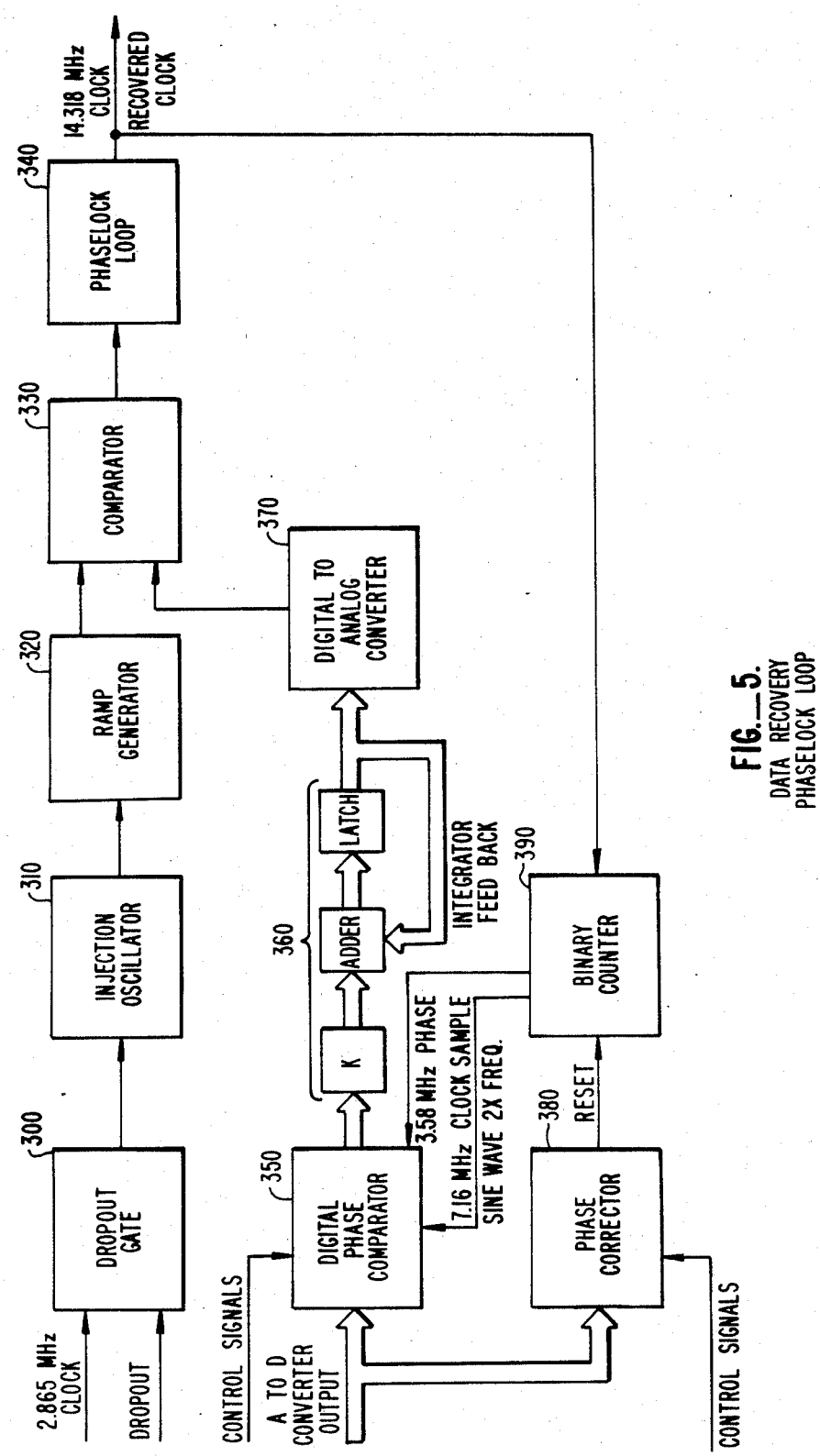
FIG._5.
DATA RECOVERY PHASELOCK LOOP

TIMING SYSTEM FOR LASER DISC HAVING DIGITAL INFORMATION

Reference is made to an attached microfiche appendix consisting of 12 microfiche and including a total of 754 frames.

BACKGROUND OF THE INVENTION

This invention relates to the storage of digital data in an analog format.

SUMMARY OF THE PRIOR ART (Timing)

Recording of digital data on optical discs has been proposed and is known. To take advantage of the possibility of rapid data retrieval possible in so-called random access disc formats, precise and immediate timing of data events or symbol sites (this latter terminology being used hereafter) is required.

Where an optical mastering process is used, followed by replication by stamping, it has been found the resulting video signals contain many timing imperfections. While these signals may be sufficient for conventional video and acoustical transmission, the resultant error rates are unacceptable for data access.

A specific example can be chosen to illustrate the problem. Given a disc replicated by stamping, suppose the disc spindle hole is slightly off center when stamping occurs. Resultant variations in the radial velocity of the disc render the sites of symbols containing the data, uncertain even in the presence of dedicated timing signals. High data error and the inability to recover data accurately results.

It has been previously proposed to utilize the chroma burst at the beginning of each horizontal scab for the timing and phase relationship of data events distributed across the horizontal scan. This proposal has not been sufficiently error free when implemented in practice.

SUMMARY OF THE INVENTION

A timing system is disclosed for reading symbol sites, analog or digital from a video signal preferable in a recorded laser format. A video signal having analog data events at precise timed intervals is recorded on a first commercial grade video recorder. The tape is replayed through a second commercial grade recorder to an optical lathe. At the time of playback to the optical lathe, a timing signal is derived from a phase lock loop circuit added to the second commercial grade and recorded on the FM band of the video signal, which signal is then etched by the lathe onto a master optical disc. Simultaneously with the recordation of the substantially continuous FM band, selected horizontal scans on each frame are loaded with both timing and reference level data, the timing portion of these selected scans being later used for phase comparison of the signal. An optical disc master results which has a continuous FM band timing track as well as an interleaved timing information contained in the video signal. Replication from the optical master to stamped copies occurs with the stamped copies being distributed to discrete players for data access. At each player, the continuous FM band timing track is used for the master clock. This continuous clock cycles a ramp generator with each clock pulse. Phase synchronization is taken from the selected horizontal scans distributed through each frame by having a phase comparator change the sample level of the cycled ramp. The changed level of the cycled ramp adjusts the phase of the master clock pulse. Precise readout of analog symbol event occurs in precise timed and phase corrected.

OTHER OBJECTS, FEATURES, AND ADVANTAGES

An object of this invention is to disclose a recorded optical disc which has detectable precision timing information thereon for the recovery of data at precise timed events. Accordingly, a disc recorded in a video format is disclosed. Clock information is discretely recorded to the FM band of the video. Phase information is placed in the video portion of the signal. By the expedient of comparing the phase information of the video with the clock information and phase shifting the clock to match the timing in the video signal, precision sampling of data sites, preferably in an analog format can occur.

An advantage of this aspect of the invention is that where optical discs are replicated—typically by stamping—precision sampling the data sites can still occur. Surface imperfections and spindle imperfections can still be accommodated and reconciled to precision sampling of data sites.

A further object of this invention is to disclose player circuitry that enables the recovery of data at precision data sites.

Other objects, features and advantages of this invention will be more apparent after referring to the following specification and attached drawings in which:

FIG. 1a is a block diagram of the Data Encoding section of the disclosed invention;

FIG. 1b, 1c, and 1d are diagrams of the leading edge of the video sweep; a line of timing and reference data in the trailing portion of a video sweep; and a line of the data portion of a video sweep.

FIG. 1b is a diagram of the digitally generated leading edge of typical video pulse;

FIG. 1c is a diagram of the digitally generated timing and reference pulse attached to the trailing edge of the leading edge illustrated in FIG. 1b;

FIG. 1d is a diagram of the generated data envelope attached to the trailing edge of the leading edge illustrated in FIG. 1b, it being understood that the waveform is only schematically shown and has a shape peculiar to the information contained within the waveform;

FIG. 2a, 2b, and 2c are illustrations of a coder and encoder that can be used with the disclosure herein for encoding data in an analog format on a video protocol;

FIG. 3 is a block diagram of the Clock Inserter utilized at a mastering facility to remove a precision clock signal from a commercial grade video recorder and independently record clock information on the FM band of the resultant video disc master;

FIG. 4 is a block diagram of the circuitry found within the player for recovering the precision timed information;

FIG. 5 is an expansion of the Phase Lock Loop portion of FIG. 4 illustrating the critical phase shift processing utilized to obtain precise data site sampling;

FIG. 6 is a schematic of the injection oscillator used to inject clock information even where clock signal dropouts have occurred; and, FIG. 7 is a schematic of the ramp generator section utilized with this invention.

Applicants have endeavored to explain in the following specification all portions of the invention in such full, clear and concise terms that reference to the following specification can occur to replicate the invention herein without undue experimentation. The reader is advised that there is filed concurrently herewith actual program listings and production drawings in a microfiche appendix.

DESCRIPTION OF THE PREFERRED EMBODIMENTS

DATA ENCODING SYSTEM, BLOCK DIAGRAM

The data encoding system converts digital data into a pseudovideo signal suitable for recording on commercial grade video tape recorders and is illustrated. Data Source 10 can be any system capable of delivering data at the rate required by the system. Data is fed to the Multisymbol Multilevel Encoder (MME) 14 on a request basis because the system must record the data to the Video Tape Recorder (VTR) 30 at standard video rates. No provisions are made for starting and stopping the recorder. The MME encodes the data into the video range of 0 to 100 IRE units. This encoded signal is multiplexed with the digital waveform generated by the Digital Video Waveform Generator 18 and fed to the Digital Filter 22. Digital Filter 22 shapes the frequency response of the signal to meet the many requirements defined by Nyquist for signal encoding plus dynamic range and frequency response requirements imposed by the VTR. The output of the Digital Filter is converted to an analog signal suitable for recording onto the video tape by the Digital to Analog Converter. Timing is controlled by a timing generator 16 which is wholly conventional contains a crystal clock, various counters and decoders. The interactive clock system between recorded data and clocking dircuitry on a player which constitutes the important aspect of this invention is hereinafter described in detail.

DATA SOURCE

The data source must supply at rates of two gigabytes per hour for period of 30 to 60 minutes depending on the data density and format of the final Data Plate. Any error correction encoding or data preprocessing must be done in the Data Source because these functions are not handled by the rest of the system. An error correction code is suitable for use with this disclosure as set forth in (Error-Correction Code for Digital Data on Video Disc, Ser. No. 505,210, Filed: 6/20/83, Neal Glover et al.). Hardware implementation of the data source is not a part of this document.

MULTISYMBOL MULTILEVEL ENCODER

The MME encodes the data for recording onto video tape.

A full disclosure of the Multisymbol Multilevel Encoder and Decoder may be found in U.S. patent application Ser. No. 650,862, filed concurrently herewith. A copy of this application is filed concurrently herewith in the appendix.

MULTILEVEL, MULTISYMBOL ENCODER AND DECODER

Referring to FIGS. 2a, 2b and 2c, a multisymbol, multilevel encoding and decoding scheme for placement of digital data into a variable density analog format is disclosed. Preferably, a video signal is utilized. Discrete symbols are contained in the video signal at exact sample times. Each symbol is given a predetermined possible excursion in level. Discrete levels are set by correspondingly discrete signal intensities at the symbol sites. Encoding occurs with levels of side-by-side symbol transmission being chosen to avoid signal overshoot or undershoot to the detriment or destruction of adjacent symbols. Apparatus is disclosed whereby with only the reprogramming of Proms on encoding and decoding apparatus, data density can be changed to compress or expand digital data density encoded in the analog format.

Referring to FIG. 2a, three two bit latches 421, 423, and 425 are all shown wired in series. These latches function to gate two bits at a time and pass the bits to provide a six bit parallel output to a master latch 430. Both units comprise LS374s wired for their respective functions.

Latch 430 is controlled by a counter 440 to emit a six bit signal to respective Proms 450, 452, 454. A counter 440 (a standard LS163) coupled to a demultiplexer 442 (an LS139) discretely addresses each latched output serially first to Prom 450 then to Prom 452 and finally to Prom 454. Each of these Proms is loaded with output binary information, typically ranging with three discrete analog levels for each combination of binary information to be encoded in the six bit format. Output coding occurs at a rate equivalent to the clocking of the binary data in which rate is in the range of one gigabyte per hour. The data is passed to a digital filter 457 and a digital to analog converter 460 for playing typically to an optical lathe.

The reader will recognize that the resultant encoder is extremely simple. A view of the table created at FIG. 2b can describe the output.

Simply stated, and referring to column D4 in the enclosed table, it can be seen that the output of the respective two bit latches will be gated out of major latch 430 an address. The addressed look-up table will then generate successive six bit levels. Those levels are indicated in the bottom of table FIG. 2b as the notations "6, 9, 3, F, 9, 0", these notations being here illustrated in hex.

The format used for transmitting the data in an analog format can be varied. We prefer placing the encoded information in a video format, although that is not required to use the illustrated encoding technique.

Referring to FIG. 2c, decoding can now be illustrated.

First, the analog signal is taken in an analog format to an analog to digital converter 510. Thereafter, the signal is converted to a four bit format and latched in successive four bit formats by three latches 512, 514, 516. These respective latches all output their respective signals in parallel to a 12 bit latch 520. Twelve bit latch in turn addresses an erasable program only memory 540, typically, a 2732 standard memory. Memory 540 contains a six bit signal addressed on a 12 bit look-up table. Those having familiarity with digital electronics will realize that the look-up table is redundant by a factor of 64. Therefore, the memory has ample space to accommodate degradation of the code in transmission and to have at more than one address the sought after combination of digital information.

The change of density in the format can be easily understood. By the expedient of only using four bits to encode, and thus only two of the latches, the density of the code can be cut by a third. Similarly, in getting the data out, the disclosed three four bit latches would look-up a table having four times many as redundant signals. Therefore, the error rate in encoding and decoding is completely adjustable.

TIMING GENERATOR

The timing generator 16 contains a crystal oscillator, a series of counters, a number of Proms and other hardware used as decoders. The timing generator produces all signals used by the system to control the transfer of data. All signals used to drive the waveform generator are also produced. Clocks are buffered and distributed to the various systems. Hardware implementation of the Timing Generator is represented on the mastering system timing generator schematic and the digital output module schematic.

The waveform used for the header of each wave is conventional and is illustrated in FIG. 1b. A horizontal sync pulse followed by a conventional chroma or color burst is utilized. It has been found that although the chroma burst is sufficient for timing of color phase information, it is not sufficient for the precise timing required.

There follows a digital phase comparator pulse used to provide rough calibration and counter reset at the beginning of each sweep.

Referring to FIG. 1c, a typical timing pulse is illustrated. The pulse includes a phase calibration sine wave which provides the master clocking of this invention. This sine wave inserted in the data field at preselected lines of the video sweep enables the timing of the data field to be precise despite local irregularity on a disc from which the information is read.

Typically, each frame starts off with 8 lines similar to the timing lines of FIGS. 1b and 1c. Thereafter, the lines are interspersed at intervals of every 55 lines in groups of three lines. Thus a typical and preferred array of such lines can include 8 beginning lines and thereafter nine groups of three lines dispersed at 55 line intervals.

Referring to FIG. 1d, the portion of the sweep that contains the data is illustrated. This data occupies the interstitial area in between the groups of timing lines and constitutes the majority of the field. The particular shape of the field is data dependent upon the analog events being recorded.

It has been found that the reference levels for the analog signal data should also be set. Accordingly, the timing frame includes reference level data so that the signals may be accurately calibrated with respect to intensity.

The raw timing information is typically recorded in the FM band of the video signal. Thereafter, the timing data is used to generate the master clock beat. The beat is phase compared and outputs to a clock at a ramp generator. Phasing of the precise clock times occurs by comparing the observed phase shift to the level of signal output at the ramp generator. This will be further discussed hereafter.

DIGITAL VIDEO WAVEFORM GENERATOR

The Digital Video Waveform Generator 18 creates all of the waveforms necessary for the output signal to be compatible with NTSC video tape recorders, as well as special signal required by the decoding circuitry in the Data Drive. NTSC waveforms required include both horizontal and vertical sync and all color burst signals. Hardware implementation of the Digital Video Waveform Generator is represented on the mastering system timing generator schematic filed herewith in the appendix. This consists mainly of Proms which are programmed with the waveforms and driven by counters. These same Proms are programmed with timing waveforms representing outputs of the timing generator. Prom listings are also provided.

MULTIPLEXER

The output video signal consists of two parts. The encoded data and the video waveforms provided by the Digital Video Waveform Generator. These signals are multiplexed into one signal by the Multiplexer. The Timing Generator controls the Multiplexer, the Waveform Generator, and the rate data is clocked into the MME insuring proper synchronization. Hardware implementation of the Multiplexer is represented on the mastering system timing generator schematic.

DIGITAL FILTER

The digital filter is a large Finite Impulse Response (FIR) filter designed to operate at the high speeds required for video processing. The coefficients have been chosen for a frequency response with a unique step shape. This shape is chosen to reduce the error probability. Hardware implementation of the Digital Filter is represented on the digital filter subsection board schematic and the digital output module schematic. Numerous subsection boards can be connected together to implement FIR filters requiring more coefficients. Twelve of these boards are used in the first system.

Digital filter designs are described in various textbooks. One good reference is "Digital Signal Processing" by Alan V. Oppenheim/Ronald W. Schafer published by Prentice Hall.

DIGITAL TO ANALOG CONVERTER

The Digital to Analog (D to A) Converter converts the digital signal into an NTSC standard one volt peak to peak signal when terminated into 75 ohms. This device is a purchased part from Tektronix model number 1900.

VIDEO TAPE RECORDER

This is a commercial quality VTR available from numerous manufacturers. Ampex Model No. VPR-80 NTSC Ser. No. 4330860.

CLOCK INSERTER, BLOCK DIAGRAM

The clock inserter is a key part of the entire Data Plate encoding, decoding system. It was observed that the signal being recovered from the video discs has timebase errors. These errors may be introduced by nonuniformities in the disc surface and/or mechanical flaws of the playback spindle. By recording a reference clock onto the disc surface along with the data signal it becomes possible to correct for these timebase errors with high accuracy using minimal circuitry. The resulting improvement in timing accuracy reduces the output error rate and allows for higher data densities.

The clock inserter circuitry creates a clock at the disc mastering facility which is recorded into a channel normally used for FM encoded audio. The majority of the system is shown on the block diagram which is provided by the disc mastering manufacturer. Only the Phaselock Loop was designed and implemented at this level.

VIDEO TAPE RECORDER

The video tape recorder 40 is a piece of equipment available from numerous manufacturers. These tape recorders use a standard tape format to allow for reproduction of the signal recorded on one machine at another location with a totally separate machine.

TIMEBASE CORRECTOR

The video tape recorder relies on fairly complex mechanical systems to move both the video tape and the playback heads. These assemblies cannot be manufactured to tolerances tight enough to eliminate timebase errors in the output signal. The time base corrector contains a large amount of complex circuitry which samples the VTR output at one clock rate storing the signal in a memory. A separate clock is used to clock data out of the memory to produce a new video signal without timebase error. Special systems in both the VTR and the timebase corrector are used to vary one or the other of these clocks as necessary to perform the correction. Such a time base corrector is sold under the mark TBC-80 NTSC by the Ampex Company of Redwood City, Calif.

FM MODULATOR

This FM circuit modulator frequency modulates (FM) the one volt peak to peak video signal onto a carrier of approximately 8.1 MHz. The modulation coefficient is 1.7 MHz per volt. The resulting signal is confined to the frequency range of 3.4 MHz to 13.5 MHz. No energy is contained around the clock frequency of 2.86 MHz which allows the Datadrive circuitry to separate the FM video signal from the clock signal using simple passive filters. Such a FM circuit modulator is sold as a part of a video disc mastering lathe by Phillips of Enidhoven, The Netherlands.

HORIZONTAL SYNC SEPARATOR

This horizontal sync separator circuit 70 separates the horizontal sync from the composite video signal. The result is a horizontal sync signal at a frequency 525 times the vertical frame rate. Because this signal is developed from the timebase corrected video it is very stable in frequency and suitable for the input to the Phaselock Loop. Such a Horizontal Sync Separator is sold as a part of a video disc mastering lathe by Phillips of Enidhoven, The Netherlands.

PHASELOCK LOOP

The phaselock loop has a phase comparator 100, loop filter 102, voltage controlled oscillator 104, and a digital countdown circuit 106 connected as a conventional phaselock loop. These circuits are described in various texts such as the book "phaselock Techniques" by Floyd M. Gardner published by Wiley. pp. 8 to 24 pp. The output signal at 2.865 MHz is 182 times the horizontal frequency of 15.7 KHz. The VCO output signal is filtered at filter 110 to produce a high purity sine wave at the 2.865 MHz. Filtering is required because harmonics of the output signal would fall into the FM video bandwidth. Hardware implementation of the Phaselock Loop is represented on the schematic phaselocked clock generator 2.865 MHz from 15.7 KHz.

SUMMER

The summer adds together the FM video signal and the clock signal. The clock signal is attenuated to 30 db below the FM video carrier. This is done to reduce the adverse effect of second harmonic distortion while at the same time keeping the clock signal well above the system noise. Such a summer is sold as a part of a video disc mastering lathe by Phillips of Enidhoven, The Netherlands.

LASER CONTROLLER

A laser is turned on and off during the disc mastering process to create the pits in the final playback surface. The Laser Controller uses the output of the Summer to controller the state of the Laser either on or off.

DATA RECOVERY, BLOCK DIAGRAM

The Data Recovery system as the name implies recovers the data from signals read off the dataplate. Laser optical read head system 200 involving a laser and multiple sensors is used to create an RF signal from the pits on a stamped optical disc made from the optical master produced by the laser control by conventional laser disc replication technology. This RF signal is fed to the Data Recovery system. The upper path on the block diagram shows the signal passing through the FM Bandpass Filter 210, and the FM demodulator 220 to create a video signal. This a degraded version of the signal generated by the Data Encoding system. The differences between the two signals are the results of distortion, noise, and dropouts. An Analog to Digital (A to D) converter 230 samples the video signal producing a digital signal. This signal pass to the Multisymbol Multilevel Decoder 240 where it is decoded back to the original data except for errors. Previous reference has been made to U.S. patent application Ser. No. 650,862, filed concurrently herewith entitled Multisymbol Multilevel Encoder and Decoder.

The middle path of the block diagram shows the clock recover. First the Clock Bandpass Filter 250 separates the sine wave clock from the RF signal. A Comparator 260 converts the sine wave to a digital signal indicated as the 2.865 MHz Clock on the diagram. A Phaselock loop creates the clocks required by the system with the highest frequency being five times the 2.865 MHz clock. The Timing Generator 280 creates various timing signals required by the system. The dataplate surface can have small defects which cause the RF signal to dropout for short periods of time. The Dropout Detector 290 detects these events. The Timing Generator has circuitry to handle the special conditions these dropouts create.

FM Bandpass Filter

Essentially all of the energy required to recover the video signal is contained in the frequency range between 3.4 MHz and 13.5 MHz. This filter rejects all signals outside of this range. This is done to reject the clock signal and any excess noise outside of the required bandwidth. Hardware implementation of the Bandpass Filter is represented on the RF board schematic.

FM Demodulator

The demodulator recreates the video signals from the FM signal. Requirements for low error rate translate to high linearity requirements for the demodulator. Hardware implementation of the FM Demodulator is represented on the RF Board schematic and is conventional.

Analog to Digital Converter

The Analog to Digital Converter samples the video at a frequency 5 times that of the 2.865 MHz clock. The actual conversion is accomplished with a commercially available integrated circuit. Circuitry is provided around this device for buffering, and automatic calibration. Hardware implementation of the A to D converter is represented on the VD2 schematic.

Clock Bandpass Filter

Due to mechanical imperfection in the dataplate centering mechanism frequency of the clock varies slightly as the disc rotates. Because of this variation the bandpass of the filter cannot be infinitely small. Taking this requirement into consideration the filter bandpass is made as small as possible to reject noise and the FM video signal which is recorded 30 db higher than the clock. The slope of the phase shift due to the filter through the clock frequency region must also be minimized. This is necessary because the phase shift translates into a timing error as clock frequency varies. Hardware implementation of the bandpass filter is represented on the RF board schematic.

Comparator

The comparator is a commercially available integrated circuit connected to create a square wave from the sine wave coming out of the Clock Bandpass Filter. Hardware implementation of the comparator is represented on the RF board schematic. The comparator is sold under the mark NE529, by the Signetics Company of Sunnyvale, Calif.

Phaselock Loop

The phaselock loop has a phase comparator, loop filter, voltage controlled oscillator, and a digital countdown circuit connected as a conventional phaselock loop. These circuits are described in various texts such as the book "Phaselock Techniques" by Floyd M. Gardner published by Wiley. Dropouts are handled by the use of an injected oscillator which continues to produce a clock when dropouts cause it to disappear. A phase shifter circuit is also required because the phase of the sampling clock cannot be accurately determined from the 2.865 MHz clock alone. Hardware implementation of the Phaselock Loop is represented on the VD3 schematic.

Timing Generator

The timing of the data recovery circuitry is very important because data becomes useless if each byte is not recovered in the right timing relationship to the other bytes. The Timing Generator 280 contains counters synchronized to the video. The output of these counters is decoded to produce all of the timing signals used in the system.

Dropout Detector

Defects in the dataplate recording surface cause the RF signal to dropout. This condition produces particular problem with the video because it is recorded in an FM format. The dropout looks like a drastic reduction in frequency resulting in a large negative pulse in the video output. Sync separator circuitry in the system is very sensitive to these negative pulses. The Dropout detector 290 detects the present of these dropouts allowing the Timing Generator circuitry to take appropriate action thus avoiding errors. Hardware implementation of the Dropout Detector is represented on the RF board schematic.

DATA RECOVERY, PHASELOCK LOOP, BLOCK DIAGRAM

The data recovery phaselock loop circuit creates the clock used to sample the video. Both the frequency and the phase of this clock are critical to low error rate data recovery. Local defects in the surface of the Dataplate coupled with defects in the playback spindle made it desirable to encode a clock in the same track as the data.

This section of the discussion describes in more detail the element which make up the Phaselock Loop as given on the Data Recovery Block Diagram. The upper path of the diagram show the 2.865 MHz clock going into the Dropout gate 300. This circuit disables the clock channel in the event of a dropout to reduce the chances of noise passing through. The Injection Oscillator 310 is a simple tank circuit oscillator with the clock being injected directly into the tank. This circuit continues to produce a reference for the phaselock loop when a dropout occurs. The Ramp Generator 320 and the Comparator 330 combine to make an electronically controlled phase shifter. The phase shifted clock is passed to the Phaselock loop 340 which produces a clock exactly 5 times the input frequency.

The middle path shows the circuitry which controls the phase shifter. Calibration sine waves are places in the video at known times. These signals are sampled by the Digital Phase Comparator 350 resulting in either a positive or negative error if the 7.16 MHz clock and the PHASE signal do not have the right timing relationship with the sine waves. The next three block represent a single stage infinite impulse response (IIR) digital filter 360. This filter acts very much like an analog integrator. When the error is zero the output value does not change. A positive or negative error cause the output value to increase or decrease respectively. The D to A converter 370 varies the threshold used by the comparator to sample the ramp voltage, effective varying the time between the input clock and the output of the comparator (in other words it shifts the phase). The range of the phase shifter circuit is limited to 160 nanosecond which is little more than the period of the 7.16 MHz clock (140 nanoseconds). The Phase Corrector 380 detects the phase of the clock with respect to a calibration waveform and resets the Binary Counter 390 if it is off by more than one count of the 14.318 MHz clock. This coupled with the 160 nanoseconds shift of the phase shifter results in a total phase shift range of 280 nanoseconds.

DROPOUT GATE

The dropout gate 300 is a simple logical NAND gate connected to gate the clock signal. This circuit is on the VD3 schematic.

INJECTION OSCILLATOR

The injection oscillator 310 is a comparator circuit connected with positive feedback and a tank circuit. This circuit by itself forms an oscillator which runs at or near the clock frequency. The 2.865 MHz clock at the output of the dropout gate is injected into the tank circuit through a resistor. During normal operation this injected dominates and the output is the same frequency as the input clock. Some phase shifting of the clock can result. In the absence of the input clock the oscillator will continue to produce a clock. The Q of the tank circuit is selected to be the lowest value possible which will result in smooth transitions from one clock to the other in the event of dropouts. Large Q values result in excessive variation of the phase shift with the input frequency of the clock. It is important to minimize this type of phase shift because the clock frequency varies if the dataplate isn't perfectly centered. This circuit is shown on the VD3 schematic.

RAMP GENERATOR

Referring to FIG. 6, the ramp generator 320 is a simple RLC generator with 321 bootstrap feedback for linearization. A transistor 322 is used to reset the generator by discharging the capacitor. A one-shot multivibrator 323 is used to control the state of the transistor either on or off. This circuit is shown on the VD3 schematic.

COMPARATOR

An integrated circuit comparator 330 is connected to the output of the ramp generator circuit. The other input to the comparator is connected to a variable reference voltage. The comparator output changes when the two voltages are equal. Since the ramp voltage varies linearly with time the timing of the output transition can be controlled simply by varying the reference signal. This variable timing shift is the same as having a voltage controlled phase shifter. This circuit is shown on the VD3 schematic.

PHASELOCK LOOP

The phaselock loop has a phase comparator, loop filter, voltage controlled oscillator, and a digital countdown circuit connected as a conventional phaselock loop. These circuits are described in various texts such as the book "Phaselock Techniques" by Floyd M. Gardner published by Wiley. The countdown circuit is configured for a divide by 5 function with the result that the output frequency of 14.318 MHz is 5 times the input frequency of the 2.865 MHz. This circuit is shown on the VD3 schematic.

DIGITAL PHASE COMPARATOR

The digital phase comparator is designed to operate in two's complement binary arithmetic. The output of the A to D converter is a 6 bit binary number. The Phase signal is a single line having two states. Six exclusive OR gates are used to perform multiplication of these two signals. This parallels the use of analog phase detectors in conventional analog circuits and result in the same nonlinear phase detection characteristic. This circuit is shown in the VD3 schematic.

K, ADDER, LATCH

These three elements are connected as a simple IIR digital filter. The multiplication by the factor K is simplified by choosing K to be an integer power of two. When this is done the multiplication is accomplished simply by shifting and for this case it incorporated in the connection of the other elements. The adder is a multiple stage adder configured from standard integrated circuits. The latch is a pair of standard integrated circuit latches. This circuit is shown on the VD3 schematic.

DIGITAL TO ANALOG CONVERTER

The digital output of the IIR digital filter goes to the A to D converter where it is converted to an analog signal. This analog signal becomes the reference voltage for the phase shifter circuit as discussed above. Conventional integrated circuits are used to implement this function. This circuit is shown on the VD3 schematic.

PHASE CORRECTOR

The phase corrector is a simple circuit using a shift register and a digital comparator. A known signal has been recorded on the dataplate and when this signal passes through the shift register the comparator will produce a reset signal for the binary counter. This circuit is shown on the VD2 schematic.

BINARY COUNTER

This is an integrated circuit connected for binary counting. This circuit divides the input clock by 2 and 4 producing the 7.16 MHz clock and the PHASE signal. This circuit is shown on the VD2 schematic.

What is claimed is:

1. A process for placing timing information on a serial track of data in a video format comprising the steps of:
    generating a series of video scans including sync pulses and a video portion;
    clocking data into at least the video portion of said scans in precise timed intervals;
    placing preselected portions of said timing information interleaved into the video portion of said data;
    playing said signal onto a video tape recorder to obtain a video tape of said data;
    replaying said video tape to an optical lathe to obtain in a laser disc format the serial data;
    during said replaying, separating out the clocking information from said data to form a separate timing signal;
    placing said separate timing signal onto a band outside of said video portion on said same recording;
    recording said timing signal and said preselected portions with the signal on said optical lathe;
    playing the laser disc and clocking the data off of said laser disc using the timing signal from the FM band of the video signal; and
    using the preselected portions of said timing signal interleaved with the data to adjust the phase of the clocking of the data to obtain precised timed location of the data sites on the video field of said video signal.

2. The process of claim 1 and wherein said placing said separate timing signal onto a band outside of said video signal include placing said signal on the FM band.

3. A process for recovering time information on a track of data in a video format comprising the steps of: providing a laser disc recording of said data in a video format having precise data sites separated by discrete time intervals; providing interleaved in the video format sample timing information having a precise data site timing with respect to the data present in said video format; providing a continuous timing signal recorded on said laser disc recording in order to precisely reproduce said signal; playing said continuous timing signal to procure a clock signal with said discrete time intervals thereon; and, playing intermittently said precise data site timing signal to phase shift said continuous timing signals to the sites of said data.

4. A recording of timing information including a laser disc recorded in the video format;
    a band of said laser disc having precise timing information recorded thereon for locating precise data sites in said video format; and said video format having interleaved timing lines thereon for phase adjustment of the timing information recorded on said band of said laser disc to the site of data on said laser disc.

5. The recording of timing information according to claim 4 wherein said band is the FM band.

6. Apparatus for the recovery of precise timed analog data from a field of video data having a recorded timing signal on a band of said video data and have interspersed timing data recorded and preselected intervals throughout the video field, said apparatus comprising in combination:
    means for generating from said band a master clock pulse;
    means for driving a ramp generator from said master clock pulse;
    means for the comparison of the phase of said clock with the phase of said interspersed timing data recorded in said video field;
    means for generating an analog signal dependent upon the comparison of said signal; and
    means for commencing a clock signal responsive to said comparison whereby said master clock is phase adjusted to the timing of said interspersed timing data.

7. The apparatus of claim 6 and wherein said means for receiving from said band said master clock signal includes an injection oscillator whereby missing pulses of said master clock can be regenerated.

8. In the combination of an optical lathe and a video recorder playing recorded digital information to said optical lathe to generate an optical master having a video recording thereon for containing digital information, the improvement comprising:
    master clock means for separating a master clock signal from said video tape recorder;
    means for discretely recording said clock signal on a band of said video recording; and
    recorded digital information for processing through said video recorder, said recorded digital information having interspersed timing information for phase comparison to said master clock signal for the precise timing of said master clock.

* * * * *